Figure 1:
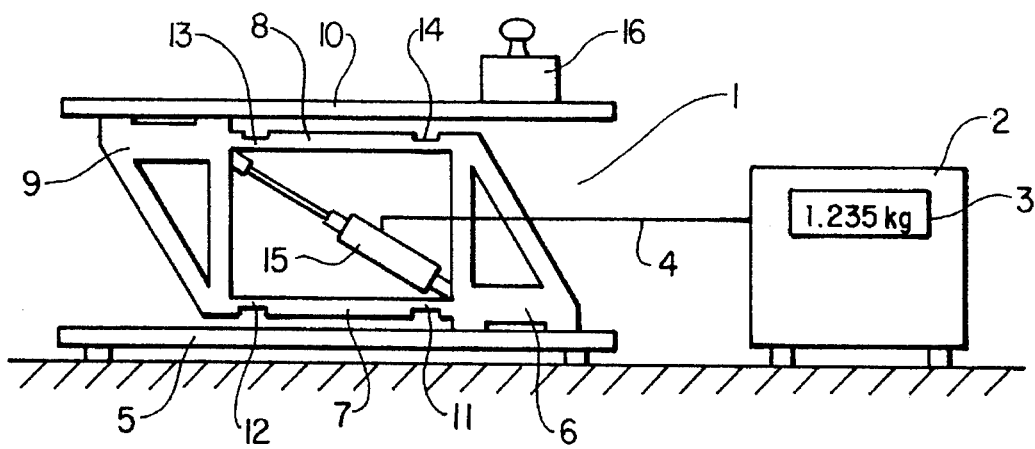

United States Patent [19]

Wirth et al.

[11] Patent Number: 5,463,192
[45] Date of Patent: Oct. 31, 1995

[54] PROCESS FOR OPERATING A MEASUREMENT INSTRUMENT, AND MEASUREMENT INSTRUMENT SUITABLE FOR USE WITH THIS PROCESS

[75] Inventors: Johannes Wirth, Zurich, Switzerland; Mario Gallo, deceased, late of Zurich, Switzerland, by Carl Burckhardt, executor

[73] Assignee: Wirth Gallo Messtechnik AG, Zurich, Switzerland

[21] Appl. No.: 555,443

[22] PCT Filed: Nov. 21, 1989

[86] PCT No.: PCT/CH89/00207

§ 371 Date: May 10, 1993

§ 102(e) Date: May 10, 1993

[87] PCT Pub. No.: WO90/07101

PCT Pub. Date: Jun. 28, 1990

[30] Foreign Application Priority Data

Dec. 14, 1988 [CH] Switzerland .................. 4618/88

[51] Int. Cl.⁶ ..................... G01G 19/40; G01G 13/14
[52] U.S. Cl. .................. 177/25.14; 177/165; 364/567
[58] Field of Search ................. 177/25.14, 164, 177/165; 364/567

[56] References Cited

U.S. PATENT DOCUMENTS

| | | | |
|---|---|---|---|
| 3,869,004 | 3/1975 | Gallo | 177/25.14 |
| 4,149,605 | 4/1979 | Mettler et al. | 177/164 X |
| 4,171,026 | 10/1979 | Gallo et al. | 177/25.14 |
| 4,310,893 | 1/1982 | Loshbough | 364/567 |
| 4,412,298 | 10/1983 | Feinland et al. | 364/567 |
| 4,535,854 | 8/1985 | Gard et al. | 177/25.14 X |
| 4,648,056 | 3/1987 | Wakefield | 177/25.14 X |
| 4,691,290 | 9/1987 | Griffen | 364/567 |
| 4,751,661 | 6/1988 | Amacher et al. | 364/567 |
| 4,792,003 | 12/1988 | Hirano et al. | 177/25.14 |

Primary Examiner—George H. Miller, Jr.
Attorney, Agent, or Firm—Jenkens & Gilchrist

[57] ABSTRACT

A measurement instrument in which, when the initially loaded instrument is partly unloaded in such a fashion that the part load falls in a lower load range with a finer display-scale interval, the instrument continues to use the scale for the larger load until the load is removed completely. When the load is removed completely, however, the display reads "zero" as soon as the result $R(m)$ at calculation stage m satisfies the condition $|R(m)| \leq d_{jmax}/2$ (zero region) where $d_{jmax}$ is the largest display-scale interval. The next-finer display-scale interval is selected if the difference $d_s$ between two successive results determined at a particular time-interval satisfies the condition $d_j \leq d_2/10$. A zero store is updated to include each result in the zero region.

14 Claims, 8 Drawing Sheets

PROCESS FOR OPERATING A MEASUREMENT INSTRUMENT, AND MEASUREMENT INSTRUMENT SUITABLE FOR USE WITH THIS PROCESS

The present invention concerns a procedure for operation of a measuring apparatus for force and mass with a numerical evaluation device which has several measuring ranges and an automatic zero point correction and a measuring apparatus operating according to this procedure.

Such measuring apparatuses are known; thus, e.g., from the Swiss Patent 550,999 with respect to the automatic zero point correction and from the West German Patent Application (Offenlegungsschrift) 2,743,326 with respect to the several measuring ranges.

In such known measuring apparatuses, the transfer from one measuring range to the next is performed as a function of force and is controlled by force. If a mass measuring apparatus is being considered, the force effected by the heavy mass of the working load is compared to that produced by a comparative mass in which the local acceleration of gravity and if necessary the inclined position of the mass measuring apparatus are taken into consideration.

In measuring apparatuses of this type, particularly in their design as commercial balances, the size of the display increment for the displayed results is selected automatically depending on the measuring range, however the computing increment used internally in the evaluation device remains constant, as is shown in the following tables by means of an example:

TABLE I

| Load Range $L_j$ (kg) | Internal Computing Increment m(g) | Display Increment $d_j$ (g) |
|---|---|---|
| 0:10 | 0.1 | 10 |
| 10:20 | 0.1 | 20 |
| 20:50 | 0.1 | 50 |
| 50:100 | 0.1 | 100 |

In other words: The result is always determined with the same absolute computing increments (for example 0.1 g) and then, corresponding to the load range, is displayed in larger display increments.

Certain parts (springs, beams, torsion elements or pneumatic elements) of the measuring apparatus are deformed when such a measuring apparatus must determine the weight of a mass falling within one of the upper load ranges. As a rule, elastic deformation results simultaneously with the stress. If the small part of the total spring deflection not present at the beginning is called $\Delta S$, the final position is striving toward the form $$\Delta S = \Delta S_o e^{-t/\tau}$$

In this case, the time constant $\tau$ is dependent on the type of deformation, the material and the temperature. This phenomenon is known and is called creep. In addition, allowance must be made for plastic deformations of very small degree.

These facts are taken into account both in construction and by the Office of Weights and Measures by placing the size of the respective display increment in a specified relationship to the maximum load of the concerned load range. Now if the load is removed from the above-mentioned measuring apparatus, the principal portion of the elastic deformation is simultaneously recovered. Creep portions and in certain cases small to very small plastic deformations remain behind.

Now if the series of display increments would be further refined, which would be possible based on the internal computing increments m, on the one hand this would have the consequence that with partial load removal from the measuring apparatus the new load would be depicted in smaller display increments, however the displayed result due to creep phenomena would reach its final value possibly only after an appreciable time, i.e. after the creep subsides. On the other hand, the measuring apparatus with complete load removal could not display "zero". I.e., the residual load remaining because of creep would certainly fall in the smallest display range, however not directly to zero because of the residual deformation. A result with numbers becoming increasingly smaller would be displayed which would always approach zero, however at best would not reach it.

The goal of the present invention is the creation of a procedure and a measuring apparatus with several display increments which will not exhibit the mentioned disadvantages and will permit the range of the display increments to be expanded in the direction of smaller units, even when the smallest display increment is smaller than the expected zero error after the largest possible load.

The method of achieving the stated goal is given in Patent claim 1 with respect to the measuring apparatus and in Patent claim 6 with respect to the procedure. The inventive concept is explained in more detail by means of the attached drawings.

Figure 2A:
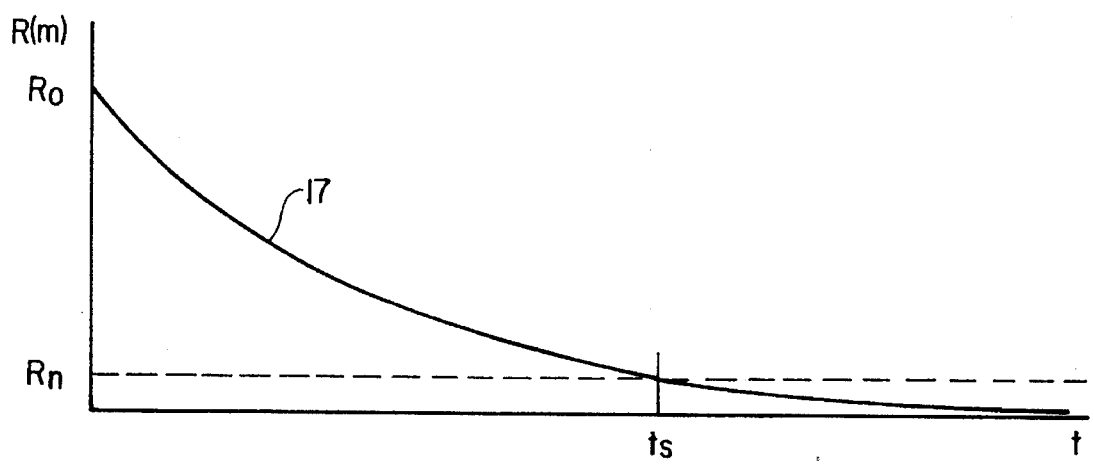
Figure 2B:
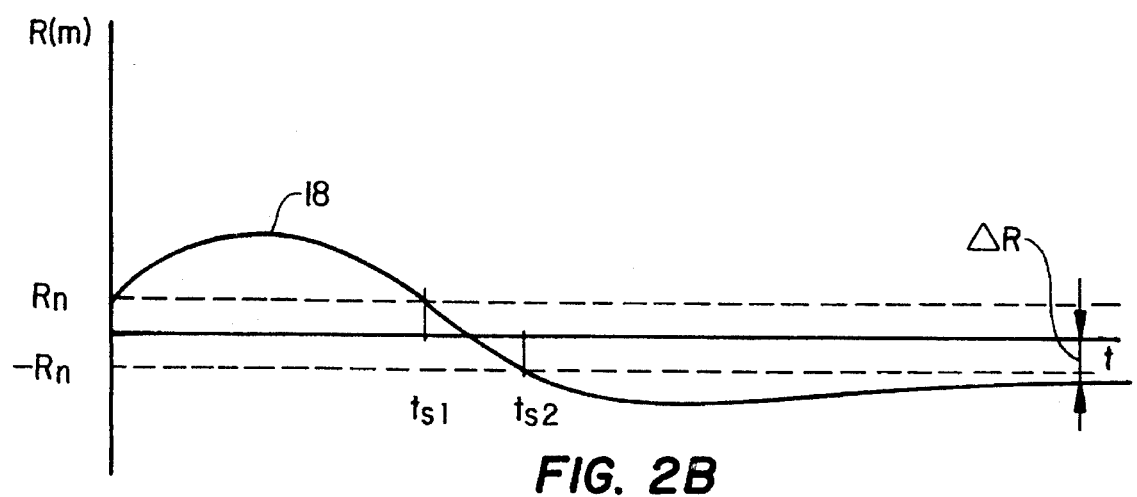
Figure 3:
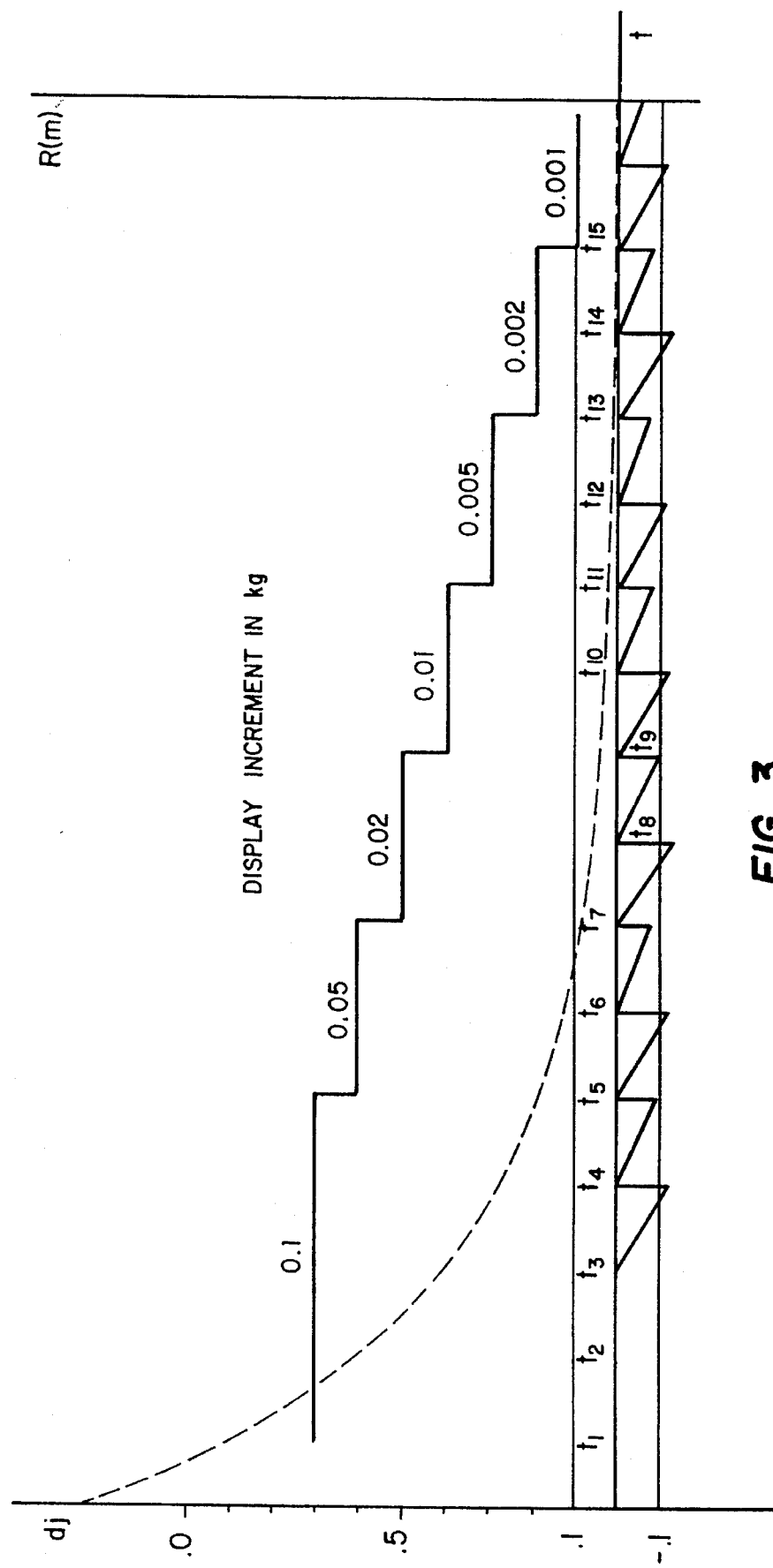
Figure 4:
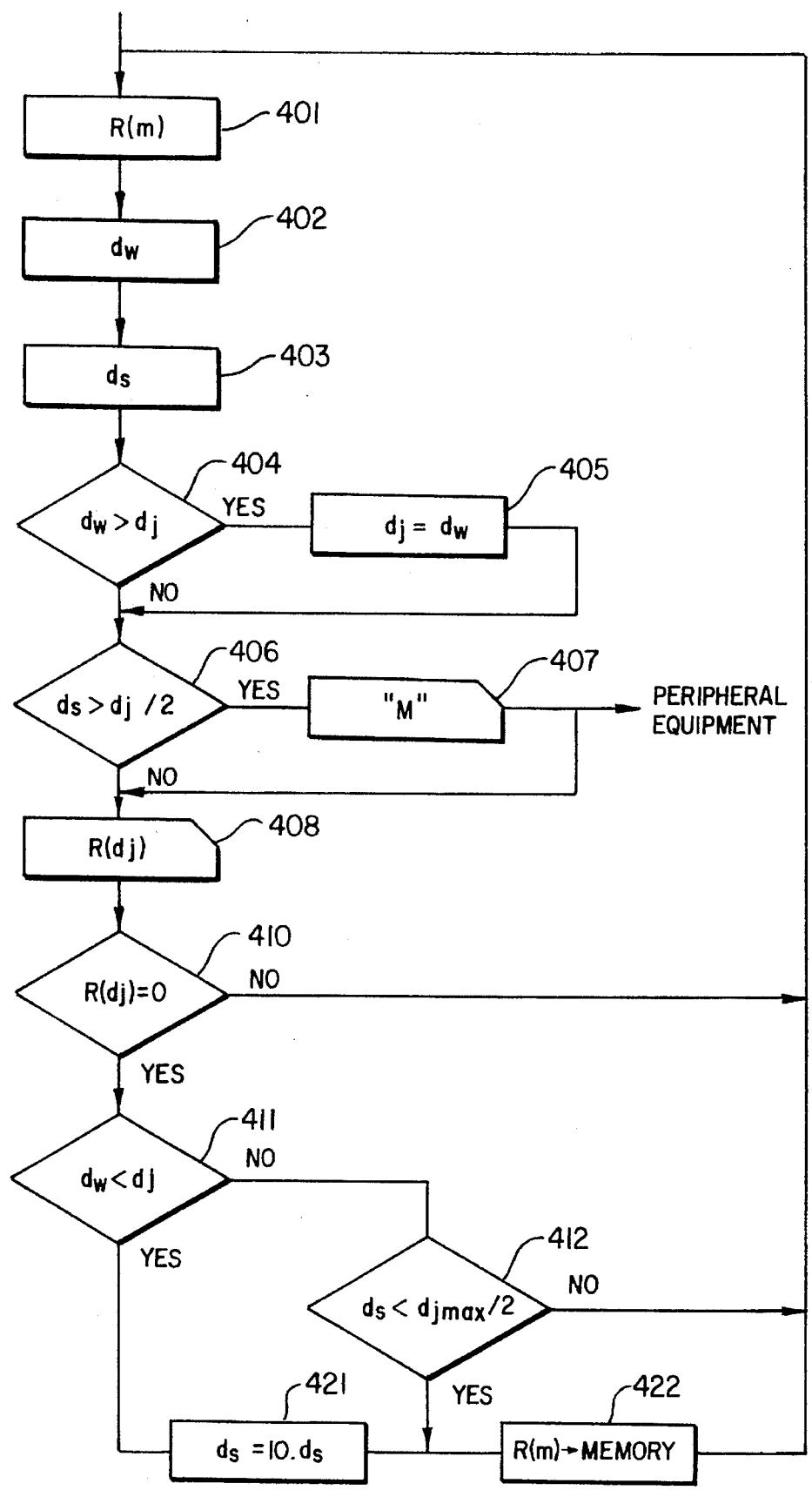
Figure 5:
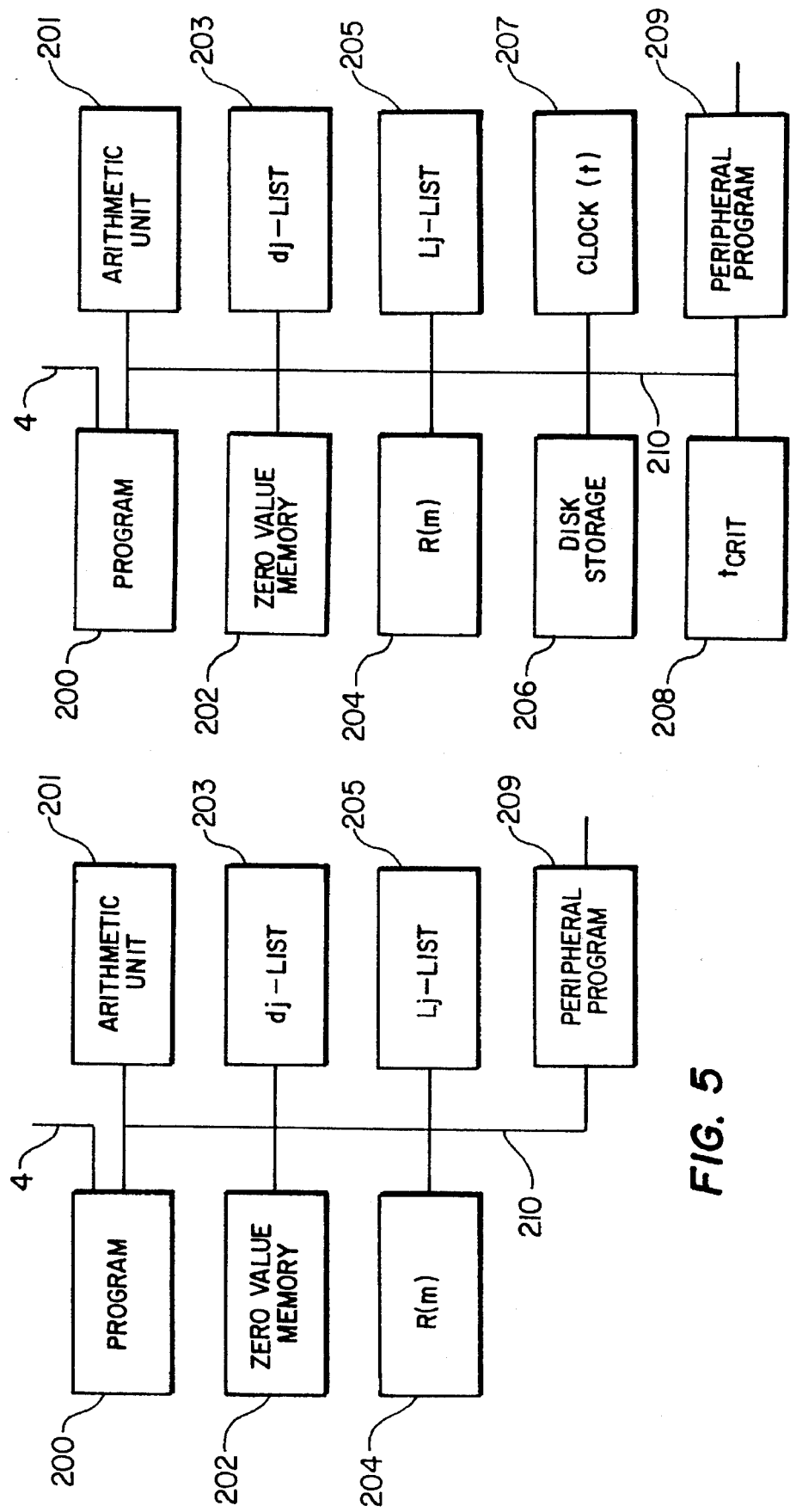
Figure 6:
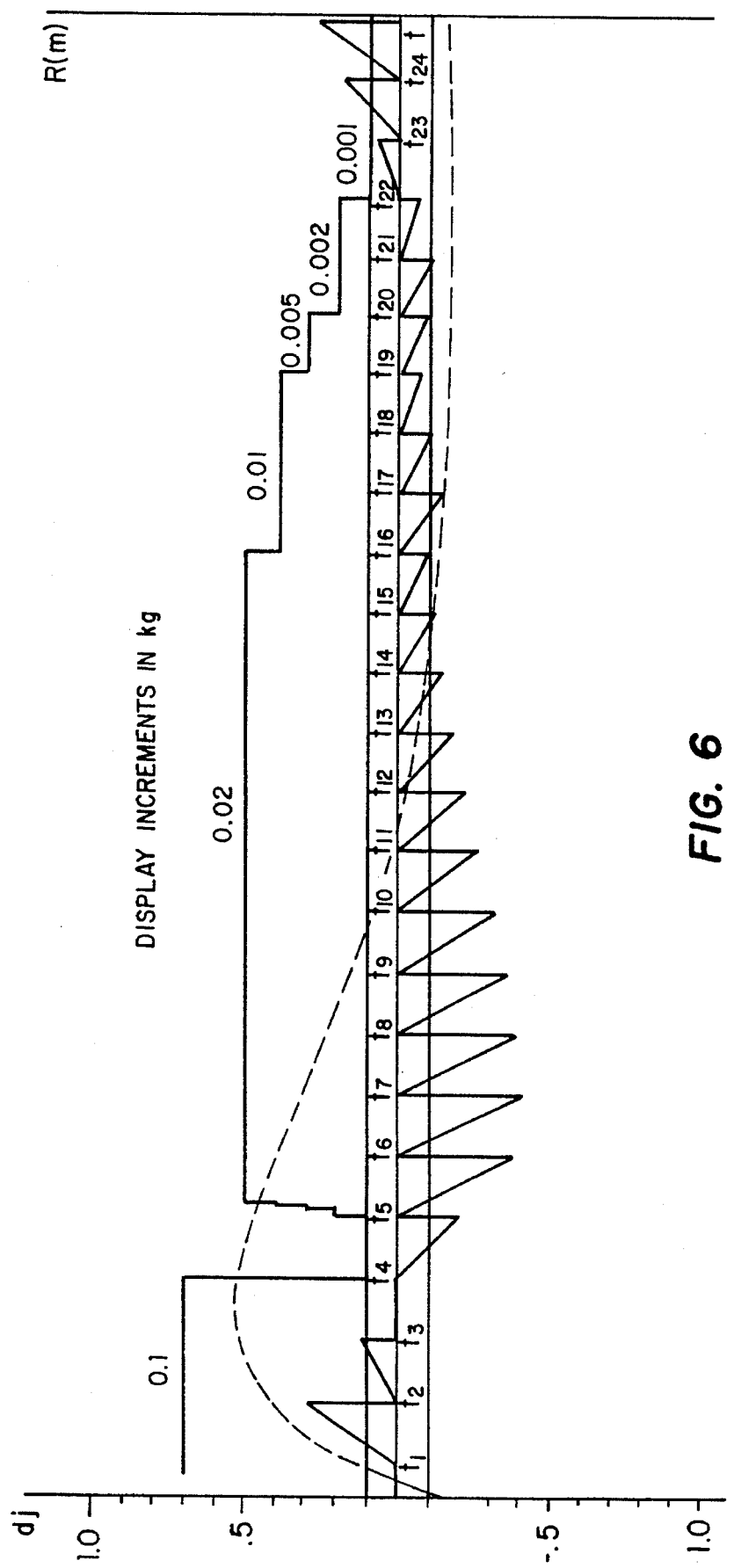
Figure 7:
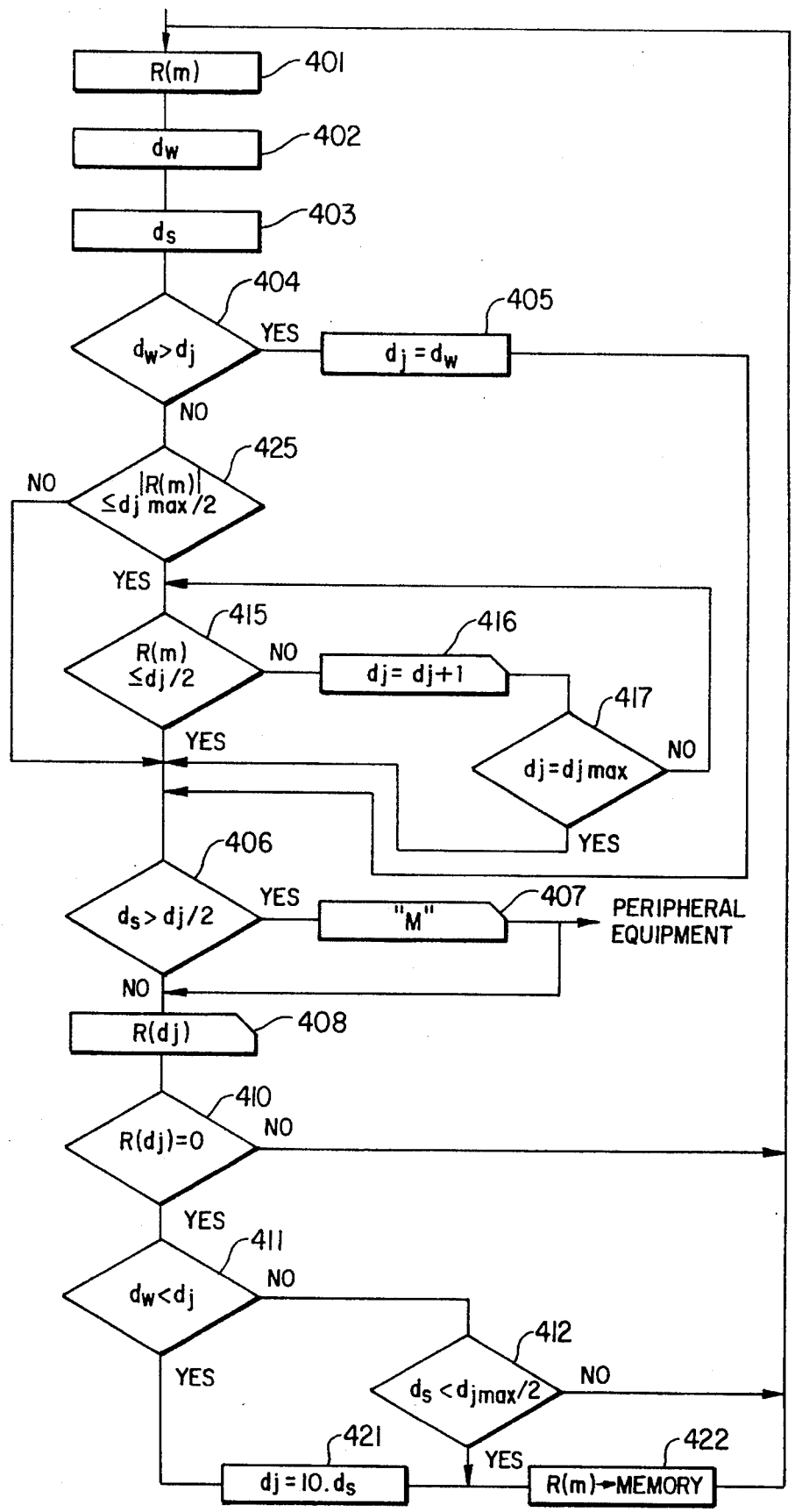
Figure 9:
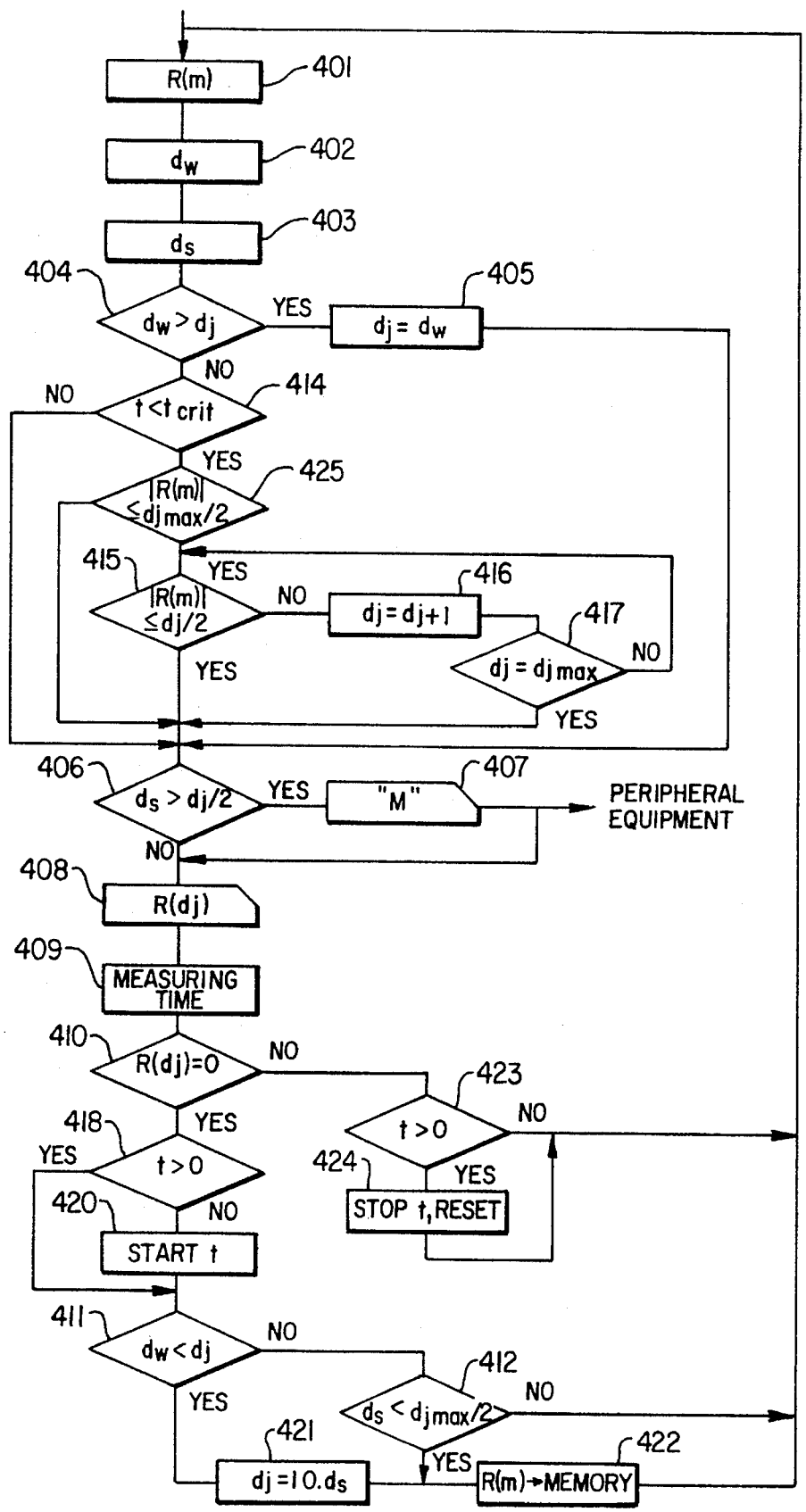
Figure 10:
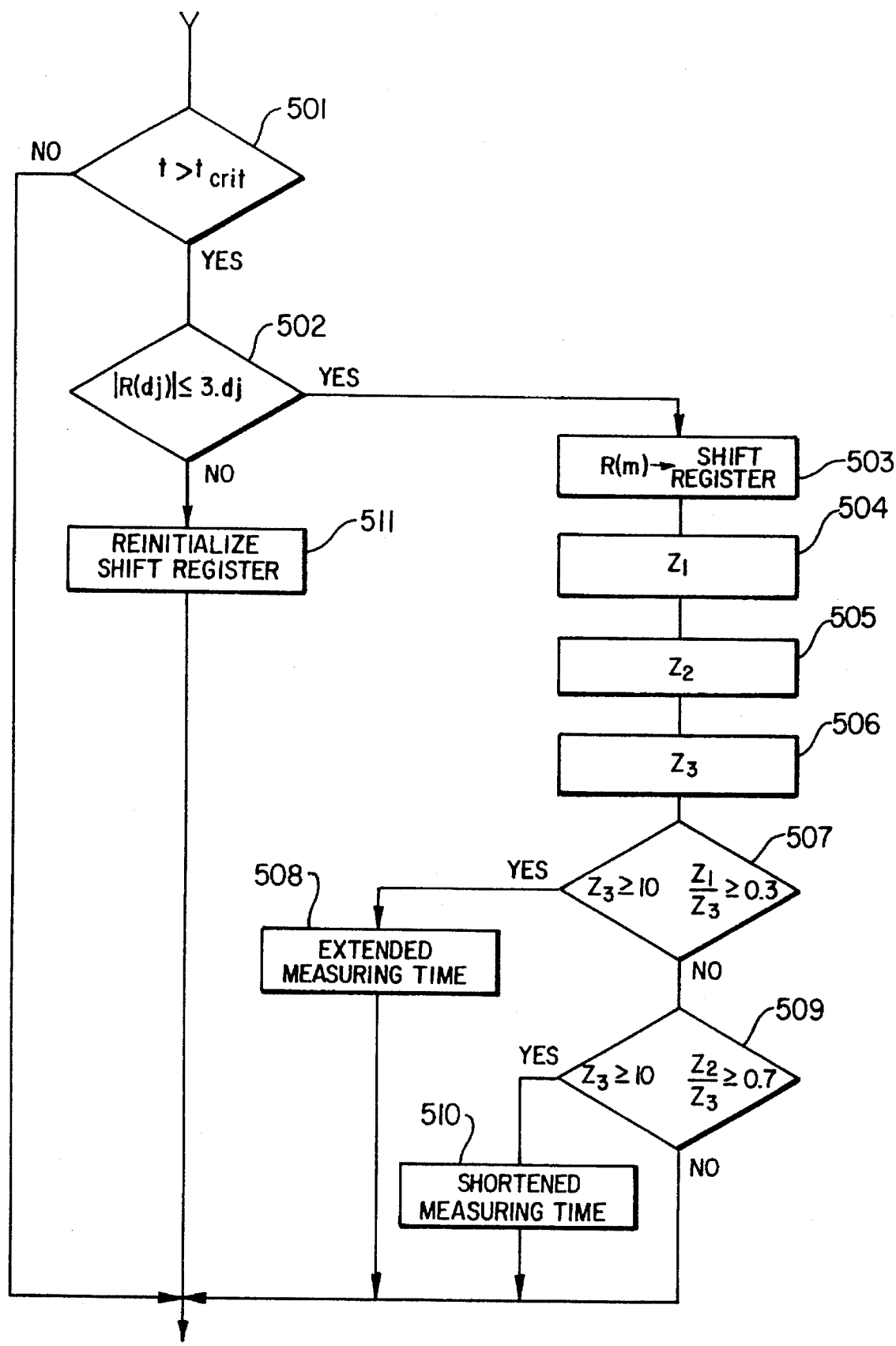

There are shown:

FIG. 1 a schematic representation of the apparatus according to the invention,

FIG. 2a,b graphs of typical creep behavior,

FIG. 3 an initial exemplary embodiment of the procedure according to the invention in the form of a graph using the curve of FIG. 2a, FIG. 4 the exemplary embodiment of FIG. 3 in the form of a flow chart, FIG. 5 an initial exemplary embodiment of the computer of the apparatus according to the invention, FIG. 6 a second exemplary embodiment of the procedure according to the invention in the form of a graph using the curve of FIG. 2b, FIG. 7 the exemplary embodiment of FIG. 6 in the form of a flow chart, FIG. 8 a second exemplary embodiment of the computer of the apparatus according to the invention, FIG. 9 a third exemplary embodiment of the procedure according to the invention in the form of a flow chart, FIG. 10 a detail of the flow chart of FIG. 9.

The following exemplary embodiments are based on Table II for load ranges and display increments which are expanded compared to Table I. The table, only in the sense of an example, retains the incremental system of Table I. Also, the expansion to smaller increments is given as an example.

TABLE II

| Load Range $L_j$ (kg) | Internal Computing Increment m(g) | Display Increment $d_j$ (g) |
|---|---|---|
| 0:1 | 0.1 | 1 |
| 1:2 | 0.1 | 2 |
| 2:5 | 0.1 | 5 |
| 5:10 | 0.1 | 10 |
| 10:20 | 0.1 | 20 |
| 20:50 | 0.1 | 50 |
| 50:100 | 0.1 | 100 |

FIG. 1 shows a schematic representation of a measuring apparatus according to the invention comprising a measuring part 1 and an attendant computer 2, for example, with built-in display apparatus 3. Measuring part 1 and computer 2 are connected by a multilead cable 4. The Measuring part 1, for example according to Swiss Patent Application 03 040/87-4, comprises a frame 6 attached to a base plate 5, which supports a load carrier 9 by means of two essentially parallel plates 7, 8, on which in turn a balance pan 10 is mounted. Plates 7, 8 each exhibit two grooves in the transverse direction acting as strap hinges 11 through 14. Force sensor 15 is installed between load carrier 9 and frame 6 proceeding diagonally—from left above to right below in FIG. 1. The weight force of the material being weighed, represented by a balance weight 16, acts on the load carrier 9, from which it is partially diverted directly to the base plate 5 through the elastic parallel guide consisting of elements 6 through 9 and 11 through 14; a different, proportional part reduced by the geometry of the apparatus acts on the force sensor 15. This transmits to the computer a corresponding electrical—analog or digital—signal corresponding to the force acting on it through multilead cable 4. In case of an analog signal, an AD converter is provided in computer 2. A (not shown) temperature sensor is connected with the force sensor 15; this transmits the temperature of measuring part 1, particularly force sensor 15, to the computer 2, also through multilead cable 4. Computer 2 contains the electronic means to carry out the computing and comparative operations depicted in the following.

The separate preparation of measuring part 1 and computer 2 is not essential to the invention. In many applications, it will be more practical to introduce computer 2 and measuring part 1 in the same housing or attached to the same base plate 5.

If the balance weight 16 is removed from the weighing pan 10, a force which corresponds to that of the original empty balance pan 10 does not act immediately on the force sensor 15 but instead the force creeps toward this value. In FIGS. 2a,b depict two of the many possible creep curves. In this case, exponential functions with positive and negative portions of the usually differing time constants can occur in summation.

FIG. 2a shows the simple case where essentially only the creep of one sign is expressed by one time constant $\tau$. The abscissa represents the time and the ordinate represents the measured result R(m) in computing increments. Curve 17 is essentially of the type $$R(m) = R(m)_o e^{-t/\tau}$$

Here, the behavior illustrated by FIG. 2 is referred precisely to complete load removal, however it happens in the same manner with partial load removals. Therefore, that which is stated for the zero value or the zero range applies analogously for a lower load value when the measuring apparatus previously had a higher load.

Creep phenomena are proportional to load change in a high degree and in all cases are small; thus, for weight determination with known measuring apparatuses these phenomena do not appear because of the mentioned limited display accuracy dependent on the load. If the series of display ranges are simply continued out to smaller increments, the problems which will be solved by the present invention result in the zero range where there is no longer an external load or result after partial load removal: Since the display accuracy is dependent on load, accuracy is best in the smallest load range which also applies to the empty balance. In the case depicted by FIG. 2a, this would lead to the condition that the balance after load removal would not immediately display zero, but instead would display a series of numerical values becoming increasingly smaller during the measuring or display cycle, until the threshold value $R_n$ for the display of zero in the smallest increment step would be reached and fallen below at the time $t_s$.

The behavior, which is depicted by curve 18 in FIG. 2b, is more complex. Here, several creep portions become noticeable; they are different both with respect to their sign and time constants. Also, R(m) after an extended time does not return to the value R(m)=0 but instead a small $\Delta R$ remains behind which arises from a small plastic deformation of a component of measuring part 1. In curve 18, $R_n$, the threshold value, is fallen below after the time $t_{s1}$, and consequently zero is displayed. After the time $t_{s2}$, however R(m) is $<-R_n$ so that a negative value is displayed. Since a plastic residual deformation is present in the case of FIG. 2b which is larger than the unit of the smaller display increment of the display apparatus 3, a value of −0.001 kg, for example, will remain.

FIGS. 3, 4, 5 depict the operating method of a first exemplary embodiment of the procedure according to the invention and the measuring apparatus according to the invention. The load ranges reported in the foregoing table and the attendant display increments are used in the context of an example. Obviously, neither the procedure nor the apparatus is bound by these numerical values used as example. Further, it is presupposed that the measured results are determined in a fixed chronological cycle, for example once per second. Also, this prerequisite is only used as an example. Also, variable measuring times are within the context of the invention.

Since reference is always made to the apparatus in the explanation of the procedure, FIG. 5 will be discussed first. It contains the elements of computer 2 according to the invention: element 200 contains the control program of computer 2. An arithmetic unit 201 carries out all logic and arithmetic operations. A zero value memory 202 whose function is described in more detail in connection with the procedure, serves for storage of the measured result R(m)* in computing increments m, which corresponds to the unloaded measuring apparatus. A $d_j$-list 203 is the memory for the series of display increments $d_j$, for example according to Table II; an $L_j$-list 205 is the memory for the maximum loads $L_j$ with each measuring range being limited to above. A function block 204 generates the measured result R(m)* in computing increments m from the signals transmitted by the force sensor 15 and perhaps from a temperature sensor through the multilead cable 4. If the signals from the force sensor 15 are not proportional to the force or are shifted by an absolute value compared to zero, the linearization and absolute value correction are included in the operating method of the function block 204. In addition, the function block 204 generates the difference from the last calculated result R(m)* and stores this in the zero value memory 202 and depicts it as result R(m). An element 209 contains the control programs of any peripheral connecting equipment.

Elements 200 through 205 and 209 of computer 2 are linked with each other through a control and data line 210.

Without first referring to FIGS. 3 and 4, the procedure according to the invention will be explained initially in a more basic manner corresponding to the first exemplary embodiment.

If the balance pan 10 is empty at first, the corresponding value R(m) based on criteria described in the following is interpreted as the first zero value, and is established and stored in the zero value memory 202. The display apparatus 3 shows 0.000 kg. The statement of the mass unit in kg is to be understood as example; in the English system, the display would be 0.000 lb, with corresponding modification of the computing and display increments. Now the balance pan 10 is loaded, for example with 80.0 kg. The number $$80.0(00) \text{ kg}$$

appears on the display apparatus 3. The zeroes placed in parentheses are not displayed since the display increment corresponding to the load is $d_j$=0.1. The creep beginning after the load is smaller than the display increment $d_j$; the display therefore can change maximally by ±0.1 kg.

After removal of the load, the computer 2 at first remain in the display increment 0.1 kg. The first result R(m) after removal of the load is checked to determine whether it falls in the range ±0.5 d (here $d_j$=0.1 kg).

The graph in FIG. 3 shows the chronological course of R(m) plotted as dotted line; the abscissa pertaining to this is on the right of the graph. The left abscissa applying to the solid curve course is $d_j$, therefore the display increment applicable in each case.

The first check yields $$R(m) > 0.5 \, d_j;$$

$$R(m) < 0.5 \, d_j$$

only applies at $t_3$.

Then, the value R(m) is read into the zero value memory and the difference from the old R(m)* is considered as new zero value; therefore, the course of the dotted curve simultaneously is shifted to below by this zero point correction.

The display apparatus now shows $$0.0 \text{ kg}$$

The next check consists of the determination of the change speed $$\frac{\Delta R(m)}{\Delta t}$$

If the operation is carried out with constant length of the measuring period, the determination is reduced to a fixed $$R(m) = R(m)_k - R(m)_{k-1}$$

in which k refers to the actual result and k−1 to the preceding result.

With the duration of the period being load-dependent or variable according to other possible criteria, the established ΔR(m) is varied correspondingly. In the sense of the above equation it is now checked whether $$\Delta R(m) < d_j/10$$

Again the number 1/10 is cited as example. With respect to the increment of the display units it needs only to be <½·½ or <½·½·5, therefore more cautiously <1/5.

The listed criterion does not apply after the first measuring period; therefore it is reserved for the display $$0.0 \text{ kg}$$

The measured value R(m) has dropped further, however at $t_4$ again fulfills the criterion $$R(m) < 0.5 \, d_j$$

with $$d_j = 0.1 \text{ kg};$$

The zero value memory is again updated, the displayed result remains at zero. The procedure is repetitive.

$$R(m) < d_j/10$$

only applies at $t_5$, always with $d_j$=0.1 kg.

Now, it is zeroed again, however at the same time the next smaller display increment with $$d_j = 0.05 \text{ kg}$$

is chosen.

The zero setting criterion is always fulfilled from this time on; the criterion for the selection of the next small display increments is only reached again at $t_7$ where $$d_j = 0.02 \text{ kg};$$

then again at $t_9$ with $$d_j = 0.01 \text{ kg},$$

at $t_{11}$ with $$d_j = 0.005 \text{ kg},$$

at $t_{13}$ with $$d_j = 0.002 \text{ kg}.$$

The smaller display increment of 0.001 kg is reached at $t_{15}$ with $$d_j = 0.001 \text{ kg}.$$

The display $$0.000 \text{ kg}$$

will appear at $t_{11}$ since from this time on the increment of the display lies in the last digit. A possible plastic deformation is considered simultaneously with the elastic residual deformations and never appears separately from this.

FIG. 4 shows the procedure illustrated above in the form of a flow chart.

Upon switching on the apparatus, an initialization procedure takes place first. Such initializations however are the state of the art and are presumed as known. The symbols used in FIGS. 4, 7, 9 and 10 are: rectangles for arithmetic operations, rectangles with cropped corners for input/output functions and diamonds represent decision operations; all "operations" are listed and numbered the same throughout.

From the signal supplied by force sensor 15, an operation 401 generates the result R(m) in computer increments m; this result at best is linearized and temperature-compensated and is reduced by the content of the zero value memory 202.

Subsequently, in the sense of an initialization, the smallest display increment is set as the increment valid at the present time, therefore $d_j = d_{jsmallest}$. A subsequent operation 402 defines the true increment of the result as $$d_w \geq R(m)/1000$$

The value $d_w$ is taken from the same list as the $d_j$ which thus is stored in the element of FIG. 5 designated by 203. The above definition of $d_w$ means: It is the smallest possible $d_w$ selected from the $d_j$ list 203 which fulfills the listed condition.

Operation 402 is operated in tandem with operation 403 which compares the actual $(R(m)_k)$ with the preceding $(R(m)_{k-1})$ measured result. The absolute amount of the difference of the listed measured values is calculated. Then, that value to which this absolute amount can be rounded off is searched from the mentioned $d_j$ list 203; this value is defined as $d_s$.

In a first decision operation 404, it is investigated whether the true increment $d_w$ will be larger than that initialized. If this is true, the value of $d_w$ is inserted in place of the value $d_j$ in an operation 405; in other respects, continue directly with an operation 406. In the following step, the operation 406 investigates whether $$d_s > d_j/2.$$

Provided that this is true, an appropriate symbol, for example an M, can be shown in the display apparatus 3 which is typified by operation 407, in which the word "motion" (for movement) appears. If, for example, an inhibit signal is transmitted to peripheral equipment, such as data printers and charging devices, this prevents actuation of the corresponding peripheral equipment. Then, the result $R(d_j)$ is displayed (operation 408); it is also displayed in the case $$d_s < d_j/2;$$

only in this case the inhibit signal is omitted. An operation 410, which follows subsequently, checks whether the result $R(d_j)=0$ in display units $d_j$ has been displayed. If this is not the case (i.e., either something is really being weighed or the measuring apparatus has just been unloaded without coming back to zero), the cycle begins again starting with operation 401. If zero has actually been displayed, a subsequent operation 411 checks whether $$d_w < d_j.$$

Two possible cases will thus be examined for explanation of the flow chart.

1. The measuring apparatus, for example, is loaded with 80.000 kg and the load has subsequently been reduced to 4.800 kg. In the first pass after the initialization $d_j=1$ g (according to Table II); in operation 402 it is determined that $d_w=100$ g; $d_s$ at first is unimportant. In operation 404, it jumps to operation 405 (since $d_w>d_j$) and again $d_j$ is placed equal to 100 g. Since the load is steady, $d_s$ certainly is <50 g; the procedure goes to operation 408, and 80.0 kg is displayed. Operation 410 jumps back to operation 401. Now if load on the measuring apparatus is reduced to 4.8 kg, $d_w$ in operation 402 is established anew at $$d_w=5 \text{ g}$$

(see Table II).
However since $$d_j=100 \text{ g}$$

is still valid, the procedure runs further with operation 406. The steady conditions will not be changed; therefore operation 408 causes 4.8 kg to be displayed; the display increment is still $d_j=100$ g: The creep procedure beginning during unloading is not visible in the display.

2. The measuring apparatus again is loaded with 80.0 kg and will subsequently be completely unloaded:

The procedure which leads to the display of 80.0 kg is the same as described above. Now it is unloaded and, for example, $$R(m)=0.3842 \text{ kg}$$

is calculated directly after unloading as first result by the function block 204 (FIG. 5) according to operation 401. Operation 402 generates $$d_w=0.001 \text{ kg}$$

from this. Since d has not changed (0.100 kg), operation 404 jumps to operation 406. The first $d_s$ calculated will amount to approximately 80 kg; therefore it is $d_s>d_j/2$. Then, for example, an "M" is shown in the display apparatus 3 and peripheral equipment, such as data printer or charge apparatuses and the like are prevented from processing the result.

Since $R(m)>d_j/2$, therefore actually 0.3842>0.050, the result $R(d_j)=0.4$ is displayed and operation 410 refers back to operation 401.

In the next measuring cycle, for example, the result will drop down to 0.0403 kg; $d_j$ is still 0.1 kg; $d_w=0.001$ kg; $d_s=d_{smax}=0.1$ kg ($\Delta R(m)=0.3842-0.0403=0.3439$ kg). Therefore, in operation 406 it still jumps to operation 407, however $R(d_j)=0.0$ is already displayed in operation 408. Operation 411 now jumps to operation 421 which defines a new $d_j$. However since both $d_j$ and $d_s$ are at their maximum values, operation 421 remains inactive and $d_j$ remains at 0.1 kg.

If the following measurement $R(m)=0.0363$ would result, $d_w=0.001$ kg, $d_s=0.005$ kg, $d_j=0.1$ kg.

Now, after the cycle has been executed up to operation 411, as described, a new $d_j=10 \cdot d_s=0.05$ kg is set in operation 421. This loop is repeated until $d_j=0.001$ kg. Only at that time does operation 411 jump to an operation 412 in which it is investigated whether $d_s<d_{jmax}/2$ is valid. This check only then does not transfer control to operation 422 when a new measurement of a force differing from zero is performed.

If the creep proceeds as in FIG. 2b, the procedure explained by FIG. 6 results: After unloading the balance pan 10 from the load of, for example, 80.0 kg, negative measured values would result because of the creep phenomena. At $t_1$ the dotted curve representing the measured values $R(m)$ will be at a small positive value. The null criterion $(R(m)<0.5 \, d_j)$ is fulfilled, it is zeroed; in contrast, there is no reason to transfer to a display with a smaller increment since $$\Delta R(m)>0.1 \, d_j.$$

The measuring period between $t_3$ and $t_4$ yields an $R(m)<<d_{jsmallest}$. Then, the criterion $$\Delta R(m)<0.1 \, d_j$$

is interrogated until it no longer applies; in this case d is reduced each time by one increment. At $t_4$ therefore $$R(m)<0.001 \text{ kg}$$

applies; therefore 0.000 kg is displayed. The successive measured value differences again increase due to the course of the curve $R(m)$. The first difference $\Delta R(m)$ is now too large for the zero criterion. Therefore, the computer 2 goes back to the series of $d_j$ until again $$\Delta R(m)<d_j/2,$$

in this case therefore down to $d_j=0.02$ kg. The further procedure is explained in the same manner as for FIG. 3.

The computing cycle is much shorter than a measuring period. The representation of the incremental increase through $d_j$ to $t_5$ is drawn expanded only for reasons of clarity.

The course of the procedure according to the invention is shown in FIG. 7. This is based on FIG. 4. Four operations 425, 415, 416, 417 are inserted between operations 404 and 406. In this case, the goal is achieved by adapting the display increment $d_j$ if need be with results which in fact lie in the zero range but whose differences $d_s$ increase again by small values. Operation 425 investigates whether the result R(m) chiefly lies in the zero range; if not, the following operations 415, 416, 417 are skipped; the procedure is continued with operation 406 as described. If R(m) actually lies in the zero range, operations 415 to 417 come into effect: operation 415 checks whether the result still lies in the zero range of the actual display increment; if yes, it jumps to operation 406; the procedure runs as described further for FIG. 4. If no, operation 416 selects the next higher value from the $d_j$ values; the subsequent operation 417 checks whether $d_j=d_{j\,max}$. If no, it is again referred back to operation 415 and the mentioned zero condition is interrogated again. If $d_j$ is actually equal to $d_{j_{max}}$, then operation 412 in that case is referred back directly to operation 401 and to a new measurement. In a modification in FIG. 7 which is not shown, $d_j$ in the series drops back only to that $d_j$ which corresponds to the just measured load. Computer 2 can also carry out the expanded procedure with the elements shown in FIG. 5; only the control program stored in element 202 needs to be changed.

The third exemplary embodiment is depicted with respect to the apparatus in FIG. 8 and the procedure in FIGS. 9 and 10.

The procedure depicted earlier depends on the assumption of absolute steadiness of the foundation of the measuring apparatus and the absence of any vibration from any source. These prerequisites as a rule are not applicable in the reality of daily use of the measuring apparatus: transient or periodic disturbances do occur. A further strategy can be drawn upon to prevent the digit number in the zero display from varying and/or measured results differing from zero from being displayed which have their origin in such disturbances: for example, if the computer is found in the zero range, it always stores ten measured results R(m). If there are three of these ten measured results (also in the context of an example) for which zero could not be displayed, the measuring time is extended, for example to twice its value. If the same result is obtained again at the now extended measuring time, it is doubled again. This successive doubling can be performed repeatedly. In this manner, a great probability exists that transient disturbances are averaged out and the danger of a flickering display is substantially reduced. The transfer to shorter measuring times is effected when the measured values R(m) in the last ten measurements (now at the extended measuring time) lie within the range $\pm 0.5\,d_j/2$.

In this strategy for extension of measuring time, transfer is permitted when a specific, preset critical time $t_{crit}$ has passed after the first result R($d_j$)=0.

Computer 2 depicted in FIG. 8 therefore undergoes several expansions compared to that in FIG. 5, i.e. by a shift register 206, a clock 207 and a read-only memory 208 for the critical time $t_{crit}$.

The term mentioned above: "The ten last measurements" is understood as the "past ten" in the sense that the measured values are read into shift register 206 which has a capacity of ten measured results. Input of a new measured value simultaneously causes loss of the oldest value.

The procedure according to FIG. 9 compared to that of FIG. 7 is expanded by that step in which the time measurement and the comparison to the critical time are active and that step in which the period of the measuring time is decided.

Compared to FIG. 7, FIG. 9 is enlarged by the following operations: An operation 414 between operation 404 and 415 checks the course of the time; if $t<t_{crit}$, operations 415 to 417 are skipped. If clock 207 by any chance still has not been started, this means $t=0<t_{crit}$. This bypass loop prevents the display increment from being increased after passage of the critical time.

After display by operation 408, it is transferred unconditionally to operation 409 in which the period of the subsequent measuring time is decided. The content of operation 409 is depicted separately in FIG. 10 and is explained in conjunction with it. After operation 410, for the case that R($d_j$)=0, a check follows by an operation 423 as to whether clock 207 is running. If yes, it is shut down by an operation 424 and reset to zero. Subsequently, it is referred back to operation 401. If clock 207 is stopped (t=0), this order is accomplished directly.

If the last displayed result was in the zero range, operation 410 addresses operation 418 which performs the same test as operation 423. If clock 207 is stopped, it is started by a subsequent operation 420, otherwise it is transferred directly to the known operation 411.

FIG. 10 now shows the procedure step, operation 409 from FIG. 9, in detail. An operation 501 performs an analog check for operation 414; if the critical time is exceeded, operation 502 is addressed, otherwise the procedure is continued at operation 410 according to FIG. 9. Operation 502 represents a loosened null criterion which takes into account the possibility of transient or periodic disturbances with a vibration character. If the displayed results satisfy this criterion, the procedure is continued with subsequent operations 503 to 510. Otherwise, the shift register 206 is reinitialized according to FIG. 8 and thus is prepared again for the procedure steps of operations 503 to 510:

Operation 503: effects input of the result in the shift register 206 is effected.

Operation 504: determines the number $Z_1$ of results R(m) found in shift register 206 which do not satisfy the condition of operation 415, therefore could not be zeroed.

Operation 505: determines the number $Z_2$ of results R(m), which satisfy the listed condition.

Operation 506: determines the number $Z_3$ of results R(m) found in shift register 206.

Operation 507: simultaneously check correctness of criteria $Z_3 \geq 10$ and $Z_1/Z_3 \geq 0.3$.

The numbers 10 or 0.3, or 0.7 for example are assumed. Other values can be provided depending on the application area of the measuring apparatus.

If the criterion of operation 507 is untrue, which is certainly correct in the first pass, operation 509 checks whether simultaneously $$Z_3 \geq 10$$

and $$Z_2/Z_3 \geq 0.7.$$

In the untrue case, it is transferred to operation 410 of FIG. 9. If the criterion of operation 507 is correct after several measuring times (and thus several passages through operation 409), the measuring time is extended by an operation 508, for example doubled. Later if sufficient results R(m) are in the zero range, operation 509 is true and the measuring time is again halved if it had been previously doubled. Generally speaking: It is shortened by the factor F if it has been extended previously by the factor F.

If the procedure in operation 507 is jumped repeatedly to operation 508, the extension of the measuring time takes place repeatedly by the factor F; the analogous applies for shortening of the measurement time during jumping to operation 510.

We claim:

1. Measuring apparatus with numerical evaluation device for measuring forces and masses which exhibits several measurement ranges and an automatic zero point correction, divided into a measuring part (1), which contains a force sensor (15) and a computer (2) with display apparatus (3), in which the force sensor (15) is connected to the computer (2) through a multilead cable (4), characterized by the fact that the computer (2) contains the following components:

an element (200) for storage of the control program of the computer (2) and for its control, an arithmetic unit (201) for execution of the logic and arithmetic operations, a zero value memory (202) for generation of the difference of successively determined zero values and for storage of the newest zero values corrected by the difference, a memory (203) for storage of a list of all assigned display increments $d_j$, an element (204) for generation of the result from the signals transmitted by the force sensor (15) and for generation of the result R(m) reduced by the content of the zero value memory (202) in computing increments m, a memory (205) for storage of a list of all assigned maximum loads $L_j$, each limiting one measuring range, a memory (209) for storage of control programs of peripheral connecting equipment, a shift register (206) for storage of a number of results R(m) in the zero range, said shift register (206) has a capacity of ten results, a clock (207) for measurement of a time t extending from a specified time defined in the procedure, a read-only memory (208) for storage of a critical time $t_{crit}$, and by the fact that the listed elements (200 through 209) are connected to element (200) through a control and data line (210) for execution of the procedure in organized interaction with the elements (200 through 209).

2. Measuring apparatus according to claim 1, characterized by the fact that element (204) is set up for linearization of the signals transmitted by the force sensor (15).

3. Measuring apparatus according to claim 1, characterized by the fact that the element (204) is set up for temperature compensation of the signals transmitted by the force sensor (15).

4. Procedure for operation of a measuring apparatus for forces and masses with numerical evaluation unit which exhibits several measuring ranges and an automatic zero point correction in which the measuring apparatus is always represented by the same computing increments m, however in display increments $d_j$ dependent on the measuring range, characterized by the fact that the signals of the force sensor (15) in a first operation (401) are processed in computing increments m to a result R(m) which is reduced by the content of the zero value memory (202), this result in a subsequent operation (402) is assigned to the matching display increment $d_j$ corresponding to the load range $L_j$, this is depicted in the matching display increment $d_j$ in the presence of a result R(m) differing from zero, the largest display increment $d_j$ reached is retained after partial unloading of the measuring apparatus, this result R(m) is interpreted as zero in the presence of a result R(m) which falls in the zero range and the zero value memory (202) is updated by this result R(m), the sensitivity of the zero display is determined by the size of the difference of successive results and results falling in the zero range $|R(m)_k - R(m)_{k-1}|$.

5. Procedure for operation of a measuring apparatus for forces and masses according to claim 4, characterized by the fact that the smallest display increment is initialized before the first measurement as the increment valid for the time being, as subsequent operation (402) will establish the instantaneous display increment $d_w$ as the smallest possible which satisfies the relationship:

$$d_w \geq R(m)/1000,$$

in which $d_w$ is obtained from the list of the $d_j$ stored in the memory (203), an operation (403) generates the difference from the actual measured value (k) and the measured value preceding this (k−1) and from this determines the smallest possible $d_s$ which satisfies the relationship:

$$d_s \geq |R(m)_k - R(m)_{k-1}|$$

in which $d_s$ is obtained from the list $d_j$ stored in memory (203), in a subsequent operation (404) it is checked whether $d_w > d_j$, whereupon in the true case a new $d_j$ is defined in an operation (405), which follows from the relationship $d_j = d_w$, and the procedure is continued by an operation (406) in the true case as well as in the untrue case, the steady condition $d_s > d_j/2$ is checked in operation (406) whereupon a record indicating the predominating unsteadiness is produced according to an operation (407), possible peripheral processing of the result is suppressed, and the result $R(d_j)$ is prepared in an operation (408) both with maintenance as well as violation of the steady condition in operation (406), a subsequent operation (410) checks the prepared result $R(d_j)$ in display increments $d_j$ as to whether it is zero and in the negative case the next measurement is subjected to the procedure with operation (401), in contrast, in the affirmative case it is checked in an operation (411) whether $d_w < d_j$ and if this is true, a new display increment is defined in an operation (421) according to the relationship $d_j = 10 \cdot d_s$; however if $d_w \geq d$, the unsteadiness of the measuring apparatus is investigated once again in an operation (412),—in this case according to the relationship $d_s < d_{jmax}/2$—in which in the affirmative case the procedure is continued at the same point as after operation (421), in the negative case the next measurement is subjected to the procedure with operation (401), an operation (422) after the executed operation (421) and affirmed steadiness check of operation (412) feeds the result R(m) representing the new zero value to the zero value memory (202) for further processing after which the next measurement is subjected to the procedure in operation (401).

6. Procedure for operation of a measuring apparatus for forces and weights according to claim 4, characterized by the fact that the display increment $d_j$ selected according to the procedure for the result $R(d_j)$ in the zero range becomes larger when the result exceeds the limits of the actual zero range given by $d_j/2$.

7. Procedure for operation of a measuring apparatus for forces and masses according to claim 5, characterized by the fact that in the course of the procedure additional operations (425, 415, 416, 417) are performed in which these only come into force when it is determined in operation (404) that $d_w \leq d_j$, the operation (425) checks whether the result R(m) is $<d_{jmax}/2$, therefore whether it lies generally in the zero range and, if not, the procedure is referred to operation (406), and, if true in contrast to operation (415), the operation (415) then checks the result whether the zero condition of the actual zero range $|R(m)| \leq d_j/2|$ is correct, and in the affirmative case the procedure is continued at operation (416), in the negative case the display increment is reduced by one digit in operation (416), subsequently operation (417) investigates whether the largest display increment is active, if untrue, the checking of operation (415) is performed again until either operation (415) jumps to operation (406) or the largest display increment has become active after which operation 417 is also referred to operation (406).

8. Procedure for operation of a measuring apparatus for forces and masses according to claim 6, characterized by the fact that after the passage of a preadjusted and stored time $t_{crit}$ a preselected number $Z_3$ of successive last results, which fulfilled a loosened zero limitation, are then checked as to whether a specified number $Z_1 < Z_3$ of these results has violated the original zero limitation, after which then, when a predetermined number of violations is present, the next measurement time is extended by the factor F, on the other hand it is checked whether a specified number $Z_2 < Z_3$ of results satisfies a sharpened zero limitation, and in case the predetermined number $Z_1$ of violations is not present but the number $Z_2$ of fulfillments in contrast is present, the next measuring time in turn is shortened by the factor F.

9. Procedure for operation of a measuring apparatus for forces and masses according to claims 7 or 8, characterized by the fact that between operations (404) and (425) an additional operation (414) is inserted which checks whether the critical time $t_{crit}$ is already exceeded and, if this is true, accepts continuance of the procedure directly until operation (406), otherwise the operation (425) and those following it come into effect, between operations (410) and (411) two operations (418, 420) are inserted, in which operation (418) checks whether the clock (207) is running and in the affirmative case refers the procedure to operation (411) and, if negative, the clock (207) is started if it is not running, two operations (423, 424) are inserted in the branch of the procedure at operation (410) referring back to operation (401), in which operation (423) in turn checks whether clock (207) is running and in the affirmative case stops it and resets it to zero, otherwise refers the procedure back to operation (401), an operation (409) which is divided into eleven process steps (operations 501–511) is inserted between operations (408) and (410) where operation (501) checks whether the critical time $t_{crit}$ is already reached, in the negative case refers the procedure to operation (410) and in the affirmative to operation (502), operation (502) checks the result $R(d_j)$ for fulfillment of the loosened zero limitation, with nonfulfillment the procedure is referred to operation (511), with fulfillment in contrast to operation (503), operation (503) inputs the actual result R(m) to shift register (206), operation (504) determines the number $Z_1$, operation (505) determines the number $Z_2$, operation (506) calculates the total number $Z_3$ of results R(m) found in shift register (206), operation (507) determines whether $Z_1$ and $Z_3$ simultaneously reach or exceed the predetermined number and in the affirmative case the procedure is referred to operation (508), in the negative to operation (509), operation (508) extends the measuring time by the factor F, operation (509) determines whether $Z_2$ and $Z_3$ simultaneously reach or exceed the predetermined number and in the affirmative case refers the procedure to operation (510), in the negative case to operation (410), operation (510) shortens the measuring time by the factor F, operation (511) erases and reinitializes the shift register, operations (508, 510, 511) refer the procedure unconditionally to operation (410).

10. Procedure for operation of a measuring apparatus for forces and masses according to claim 8, characterized by the fact that Z=3, Z=7, and Z=10.

11. Procedure for operation of a measuring apparatus for forces and masses according to claim 8, characterized by the fact that the loosened zero limitation reads $|R(d_j)| \leq 3 \cdot d_j$.

12. Procedure for operation of a measuring apparatus for forces and masses according to claim 8, characterized by the fact that the sharpened zero limitation reads $|R(d_j)| \leq d_j/4$.

13. Procedure for operation of a measuring apparatus for forces and masses according to claim 8, characterized by the fact that factor F is a number between 2 and 10.

14. Procedure for operation of a measuring apparatus for forces and masses according to claim 4, characterized by the fact that the following load ranges $L_j$, computing increments m and display increments $d_j$ occur and are allocated to one another as follows:

| Load Range $L_j$ (kg) | Internal Computing Increment m(g) | Display Increment $d_j$ (g) |
| --- | --- | --- |
| 0:1 | 0.1 | 1 |
| 1:2 | 0.1 | 2 |
| 2:5 | 0.1 | 5 |

| Load Range $L_j$ (kg) | Internal Computing Increment m(g) | Display Increment $d_j$ (g) |
|---|---|---|
| 5:10 | 0.1 | 10 |
| 10:20 | 0.1 | 20 |
| 20:50 | 0.1 | 50 |
| 50:100 | 0.1 | 100 |

* * * * *